(12) United States Patent
Haji-Sheikh et al.

(10) Patent No.: US 6,626,044 B1
(45) Date of Patent: Sep. 30, 2003

(54) FREEZE RESISTANT SENSOR

(75) Inventors: Michael J. Haji-Sheikh, Richardson, TX (US); Richard Alan Davis, Plano, TX (US); Mark Robert Plagens, Richardson, TX (US); Carl Edward Stewart, Plano, TX (US); Gilberto Morales, Arlington, TX (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/677,895

(22) Filed: Oct. 3, 2000

(51) Int. Cl.[7] .................................................. G01L 7/08
(52) U.S. Cl. ............................ 73/715; 73/724; 73/727; 361/283.4
(58) Field of Search ......................... 73/715, 727, 723, 73/729, 756, 754, 861, 229, 231, 302, 724; 210/123; 338/42; 361/283.4

(56) References Cited

U.S. PATENT DOCUMENTS

| 4,248,294 A | * | 2/1981 | Budzynski et al. ......... 165/104 |
| 4,276,533 A | | 6/1981 | Tominaga et al. |
| 4,891,120 A | * | 1/1990 | Sethi et al. .................. 204/299 |
| 5,055,185 A | * | 10/1991 | McMurphy ................. 210/123 |
| 5,090,242 A | * | 2/1992 | Hilton ......................... 73/302 |
| 5,174,156 A | | 12/1992 | Johnson et al. ............... 73/715 |
| 5,360,521 A | | 11/1994 | Davis et al. ............. 204/129.3 |
| 5,412,994 A | * | 5/1995 | Cook et al. ................... 73/756 |
| 5,509,312 A | | 4/1996 | Donzier et al. |
| 5,792,958 A | * | 8/1998 | Speldrich ..................... 73/727 |
| 6,212,959 B1 | * | 4/2001 | Perkins ..................... 73/861.77 |

FOREIGN PATENT DOCUMENTS

JP 03 123833 5/1991

* cited by examiner

Primary Examiner—Andrew H. Hirshfeld
Assistant Examiner—Marissa Ferguson
(74) Attorney, Agent, or Firm—Kris T. Fredrick

(57) ABSTRACT

A sensor having freeze resistant features is disclosed. The sensor includes a sensor die and a buffer member that are assembled for attachment to a process fluid conduit. The buffer member defines an opening in fluid communication with the process fluid. The sensor die has a flexible diaphragm, and a capillary channel establishes fluid communication between the diaphragm area of the sensor die and the opening in the buffer member.

19 Claims, 1 Drawing Sheet

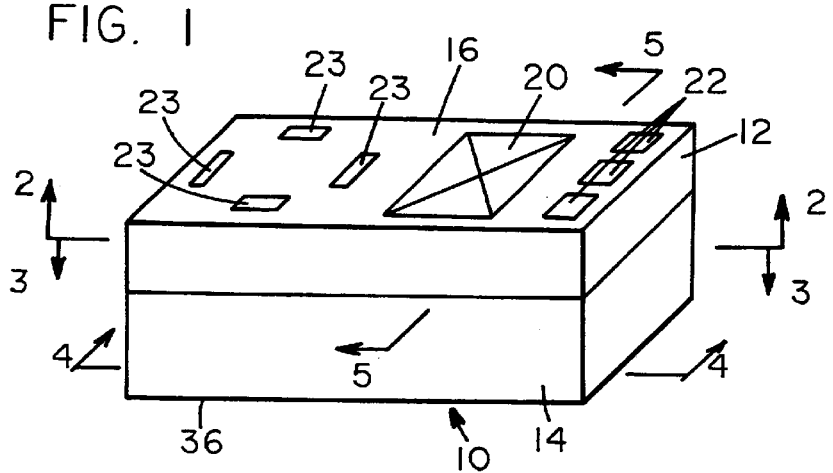
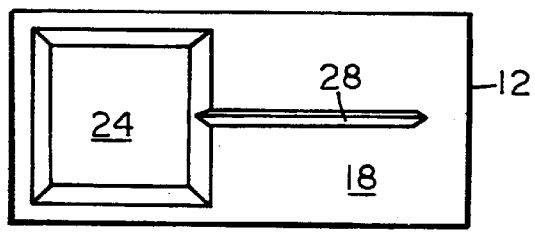
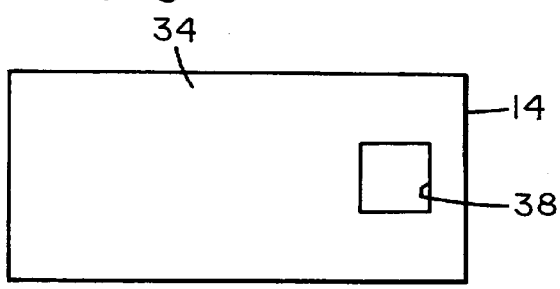
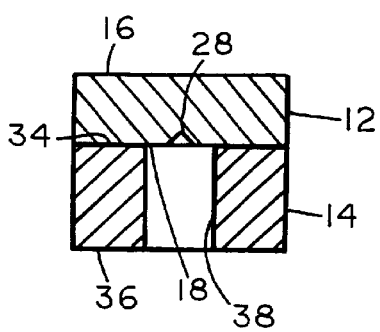
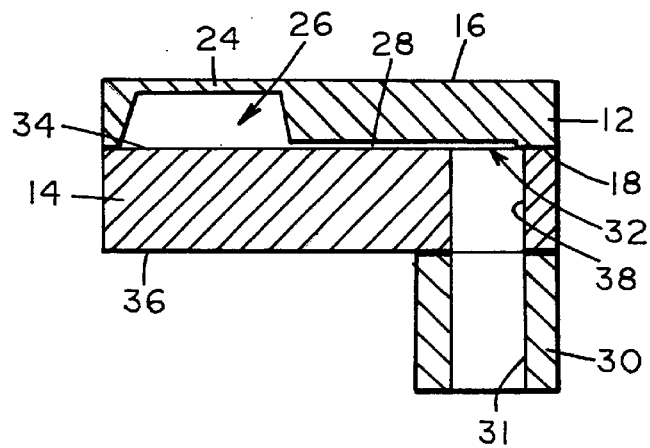

FREEZE RESISTANT SENSOR

FIELD OF THE INVENTION

The present invention generally relates to sensors and, more specifically, to a pressure sensor, accelerometer or the like that is resistant to damage from freezing.

BACKGROUND OF THE INVENTION

Various types of pressure sensors are generally known to those skilled in the art. One type of pressure sensing device comprises a silicon die that is etched to form a cavity in a surface of the die. The etched cavity does not extend entirely through the thickness of the die but, instead, a diaphragm portion is left remaining in the opposite surface of the silicon substrate. The diaphragm portion is sufficiently thin to flex in response to differences in pressure on its upper and lower surfaces. In a manner that is well known to those skilled in the art, stress sensitive components can be disposed on the upper surface of the diaphragm portion formed over the cavity. When the diaphragm portion flexes in response to pressure exerted on it, the stress sensitive components provide a means for detecting the flexing of the diaphragm portion. It is common for piezoresistors to be used as the stress sensing components.

In order to achieve miniaturization, an electronic circuit can be disposed on a common surface of the pressure sensor die with the stress sensing components. In addition, electrically conductive pads can be deposited on the same surface of the pressure sensor die in order to facilitate the connection of the die to external devices. The pressure sensor die is commonly made of silicon. In addition, it can be attached to a silicon or glass substrate which provides stress isolation between the diaphragm portion of the die and external components, such as fluid conduits, which are typically used to conduct a flow of a fluid to the cavity portion of the die or to the portion above the diaphragm portion of the die. Silicon pressure transducers of this general type can be used to measure either absolute pressure or differential pressure.

Pressure sensing devices of the above type are susceptible to damage due to freezing. During operation, it will be appreciated that the silicon die has a temperature that is elevated relative to the surrounding area. When operations subsequently cease, the die gradually cools to ambient temperature, thereby creating a slight vacuum in the cavity. Simultaneously, the cooling silicon die creates condensation, and the vacuum in the cavity tends to pull the condensation into the cavity. When the ambient temperature drops below freezing, the volume of condensation expands as it forms ice, thereby potentially damaging the die and buffer.

U.S. Pat. No. 5,412,994, which issued to Cook et al. on May 9, 1995, discloses an offset pressure sensor in which the pressure sensing components are isolated from a portion of an attached buffer member which is connected to a fluid conduit. The buffer has an opening, while the sensor die has a cavity defining a diaphragm, the cavity being offset from the opening. The opening and the cavity are placed in fluid communication by a relatively large channel formed in the glass buffer. The pressure sensor may also include elastomeric conductors and pressure seals to eliminate the need for making solder connections between the sensor structure and external components. The offset layout and elastomeric conductors isolate stresses transmitted between an attached external fluid conduit and sensitive components of the pressure sensor.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

In accordance with certain aspects of the present invention, a sensor is provided comprising a buffer member having upper and lower surfaces and defining an opening extending from the upper surface to the lower surface. A pressure sensor die has a first surface and a second surface attached to the upper surface of the buffer member. The pressure sensor die further has a diaphragm portion of the first surface extending across a cavity formed in the second surface of the pressure sensor die. A capillary channel has a first end in fluid communication with the cavity and a second end in fluid communication with the opening of the buffer member, the capillary channel having a cross-sectional area sized to resist liquid flow therethrough. The diaphragm portion functions as a pressure sensing component, and a first fluid conduit is disposed in fluid communication with the opening of the buffer member.

In accordance with additional aspects of the present invention, a pressure sensor is provided having freeze resistant characteristics. The pressure sensor comprises a glass buffer member having upper and lower surfaces and an opening extending from the upper to the lower surface. A silicon die has an upper surface and a lower surface adapted for attachment to the upper surface of the buffer member, a cavity formed in the lower surface of the silicon die defining a flexible diaphragm portion of the silicon die, and a capillary channel formed in the lower surface of the silicon die extending from the cavity to an inlet portion of the silicon die located adjacent the opening to establish fluid communication between the opening and the cavity. The diaphragm portion functions as a pressure sensing component.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 1 is a perspective view of an assembled sensor die and buffer member in accordance with the present invention.

FIG. 2 is a bottom view of the sensor die taken along line 2—2 of FIG. 1.

FIG. 3 is a top view of the buffer member taken along line 3—3 of FIG. 1.

FIG. 4 is a side elevation view, in cross-section, of the assembled sensor die and buffer member taken along line 4—4 of FIG. 1 and attached to a fluid conduit.

FIG. 5 is an end view, in cross-section, of the assembled sensor die and buffer member taken along line 5—5 of FIG. 1.

DETAILED DESCRIPTION OF THE INVENTION

The present invention can take several forms, including a pressure sensor and an accelerometer, but for purposes of illustration only the present invention will be described in the context of a pressure sensor. Turning to the drawings, FIG. 1 illustrates a pressure sensor 10 in accordance with the present invention. The pressure sensor 10 includes a sensor die 12 and an associated buffer member 14. The sensor die 12 has an upper surface 16 and a lower surface 18 (FIG. 2). An electronic circuit 20 is provided on the upper surface 16 of the sensor die 12 as schematically illustrated in FIG. 1. Three conductive pads 22 are also provided on the upper surface 16 and are connected in signal communication with the electronic circuit 20. A plurality of pressure sensing components 23, such as piezoresistors, are provided on the upper surface 16 of the sensor die 12 in a manner that is well known to those skilled in the art of pressure sensor design.

A portion of the sensor die 12 is formed with a pressure-responsive diaphragm 24. As best shown with reference to FIGS. 2 and 4, a cavity 26 is formed in the lower surface 18 of the sensor die 12 such that a relatively thin portion of the sensor die 12 remains near the upper surface 16. This relatively thin portion forms the diaphragm 24. In the preferred embodiment, the sensor die 12 is made of silicon and the cavity 26 is formed using a stop-etch method, as described in greater detail in commonly owned U.S. Pat. No. 5,360,521. The thin diaphragm 24 will flex in response to pressure forces acting either on the lower surface 18 of the sensor die 12 at the cavity 26 or at the upper surface 16 in an area opposite the cavity 26. As the diaphragm 24 flexes, the pressure sensing components 23 also flex to alter a signal output.

A capillary channel 28 is also formed in the lower surface 18 of the sensor die 12 for establishing fluid communication between the cavity 26 and a process fluid conduit 30 (FIG. 4). The capillary channel can be formed in the buffer member as will become apparent to those skilled in the art. The capillary channel 28 extends from the cavity 26 to an inlet portion 32 of the sensor die 12. As best shown in FIG. 5, the capillary channel 28 has a relatively small cross-sectional area and a generally v-shaped cross-sectional shape. The capillary channel 28 is also preferably formed at the same time as the cavity 26 using the same stop-etch method noted above, which inherently produces a v-shaped cross-section. It will be appreciated, however, that other cross-sectional shapes can be used without departing from the scope of the present invention.

With reference to FIGS. 3 and 4, the buffer member 14 has an upper surface 34 and a lower surface 36. An opening 38 is formed through the buffer member 14 that extends from the upper surface 34 to the lower surface 36. The remainder of the upper surface 34 of the buffer member 14 is relatively planar so that, when the upper surface 34 of the buffer member 14 is attached to the lower surface 18 of the sensor die 12, the open face of the cavity 26 and most of the capillary channel 28 is closed off (FIG. 4). The inlet end 32 of the capillary channel 28, however, extends to the opening 38 so that the opening 38 fluidly communicates with the cavity 26.

The process fluid conduit 30 is provided as an interface between the pressure sensor 10 and the process fluid. The conduit 30 defines a passage 31 that is axially aligned with the opening 38 of the buffer member 14. In a preferred embodiment, Invar is used to form the conduit 30. This alloy, which comprises 36% nickel and 64% iron, has a low thermal co-efficient of expansion which is similar to that of silicon. As a result, silicon sensor performance over temperature is improved by reducing temperature-induced mechanical strain that could otherwise be transmitted to the sensor die.

In a particularly preferred embodiment of the present invention, the buffer member 14 is made of Hoya SD2 glass, which has a thermal co-efficient of expansion that is very similar to that of silicon. The Hoya SD2 glass is attached to the sensor die 12 by thermal-electric bonding. In addition, the lower surface 36 of the buffer member 14 is metallized in order to enhance the solderability of the lower surface 36 to the process fluid conduit 30. The solder material is preferably a tin-silver eutectic solder. This particular material is selected for use as the solder in a preferred embodiment because of its media compatibility and low creep characteristics. In addition, this particular type of solder does not require excessively high temperatures during the bonding process and, therefore, results in lower sensor hysteresis that could be caused by solder strain in the package.

The capillary channel 28 of the present invention is sized so that it discourages condensation from entering the cavity 26. More specifically, the capillary channel 28 is sized so that it is large enough to communicate process fluid pressure from the conduit 30 to the cavity 26 during operation yet small enough to discourage condensation from being pulled into the cavity 26 when operation has ceased and the pressure sensor 10 cools. In the preferred embodiment, the cross-sectional area of the channel 28 is equal to or less than approximately 6 square mils (0.006 in$^2$). The small cross-sectional area of the channel 28 produces a capillary action which resists the flow of condensation therethrough. As a result, the risk of condensation freezing inside the channel 28 and cavity 26 is reduced.

While, in the illustrated embodiment, the capillary channel 28 is shown as formed in the sensor die 12, it will be appreciated that the channel can also be formed in the buffer member 14. The channel is more challenging to form in glass, however, since a mechanical operation is typically performed to form the channel. The small cross-sectional area needed for the capillary channel 28 is particularly difficult to form with conventional machinery; and, therefore, this alternative, while possible, is not preferred.

According to the illustrated embodiment, the cavity 26 formed in the sensor die 12 is offset from the opening 38 formed in the buffer member 14. The opening 38 is disposed at one end of the combined structure and the cavity 26 and diaphragm 24 are disposed at an opposite end of the combined structure. This offset characteristic improves the stress isolation between the attachment of the composite structure to a fluid conduit and the location on the sensor die where the sensitive components are located, as described more fully in commonly owned U.S. Pat. No. 5,412,994 incorporated herein by reference. Improved stress isolation increases accuracy and reduces packaging errors.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive nor to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A sensor, comprising:
    a buffer member having upper and lower surfaces and defining an opening extending from the upper surface to the lower surface;
    a die with a first surface and a second surface attached to the upper surface of the buffer member, the die having a diaphragm portion of the first surface extending across a cavity formed in the second surface of the die;
    a capillary channel having a first end in fluid communication with the cavity of the die and a second end in fluid communication with the opening of the buffer member, the capillary channel having a cross-sectional area equal to or less than approximately 6 square mils and sized to resist liquid flow therethrough; and
    a first fluid conduit disposed in fluid communication with the opening of the buffer member.

2. The sensor of claim 1, in which the opening is disposed in nonaligned association with the cavity.

3. The sensor of claim 1, in which the diaphragm portion and the opening are disposed at opposite ends of the sensor.

4. The sensor of claim 1, in which the capillary channel is formed in the second surface of the die.

5. The sensor of claim 4, in which the capillary channel has a v-shaped cross-section.

6. The sensor of claim 1, further comprising an electronic circuit connected in signal communication with the die.

7. The sensor of claim 1, in which the lower surface of the buffer member is metallized.

8. The sensor of claim 1, in which the buffer member and die are thermal-electrically bonded together.

9. The sensor of claim 1, in which the buffer member is glass.

10. The sensor of claim 1, in which the die is silicon.

11. A sensor having freeze resistant characteristics, the sensor comprising:
    a buffer member having upper and lower surfaces and an opening extending from the upper to the lower surface;
    a die with an upper surface and a lower surface, the lower surface attached to the upper surface of the buffer member, a cavity formed in the lower surface of the die defining a diaphragm portion of the die upper surface; and
    a capillary channel in fluid communication with an inlet portion of the die located adjacent the opening of the buffer member to establish fluid communication between the opening and the cavity, the capillary channel having a cross-sectional area equal to or less than approximately 6 square mils.

12. The sensor of claim 11, in which the opening is disposed in nonaligned association with the cavity.

13. The sensor of claim 11, in which the diaphragm portion and the opening are disposed at opposite ends of the sensor.

14. The sensor of claim 11, in which the capillary channel has a v-shaped cross-section.

15. The sensor of claim 11, further comprising an electronic circuit connected in signal communication with the diaphragm portion.

16. The sensor of claim 11, in which the lower surface of the buffer member is metallized.

17. The sensor of claim 11, in which the buffer member and die are thermal-electrically bonded together.

18. The sensor of claim 11, in which the buffer member is glass.

19. The sensor of claim 11, in which the die is silicon.

* * * * *